Figure 5:
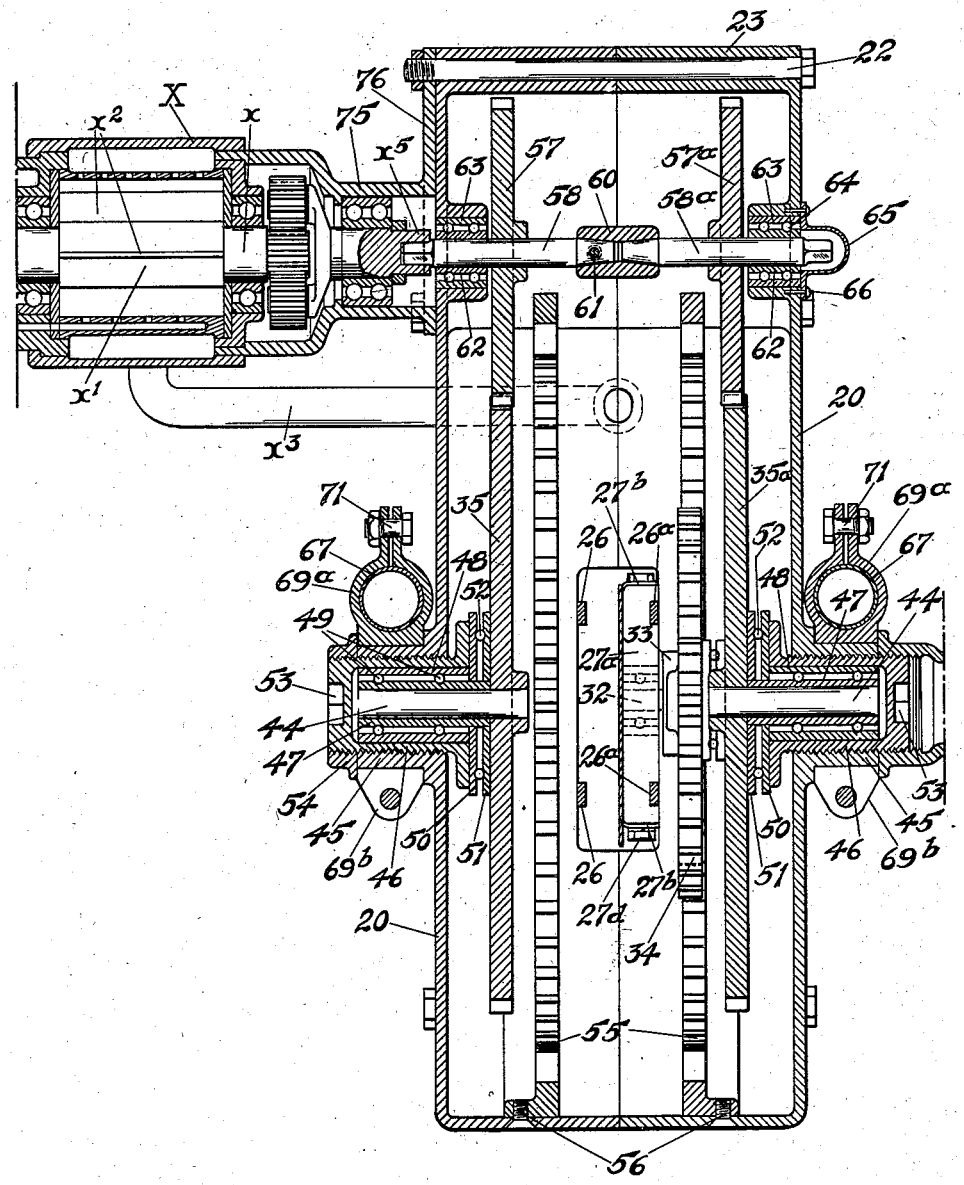

May 26, 1942.  E. DE V. TOMPKINS  2,283,958
PORTABLE SAWING APPARATUS
Filed April 21, 1937   5 Sheets-Sheet 1
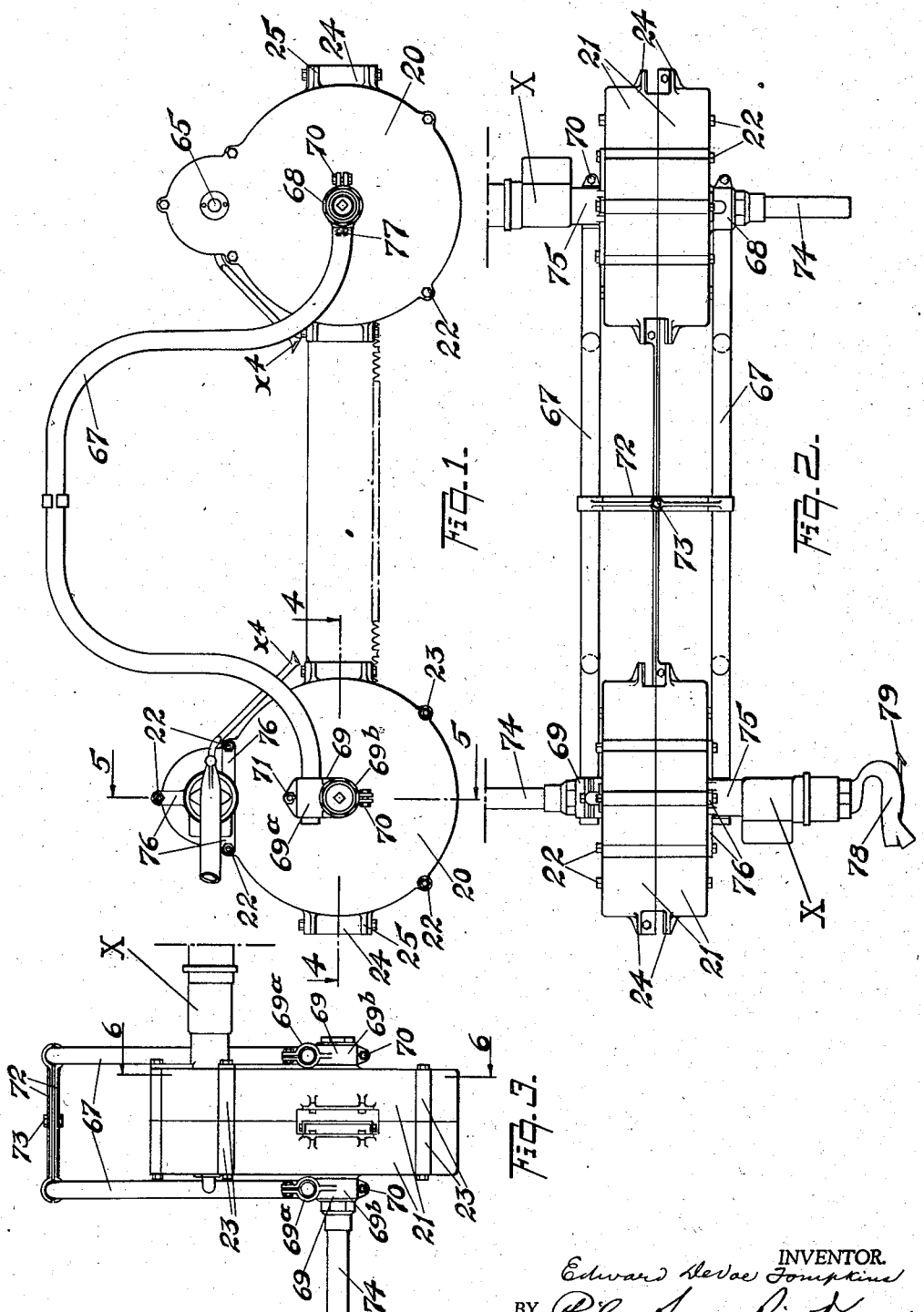
INVENTOR.
Edward DeVoe Tompkins
BY Phillips, Sawyer, Rice & Kennedy
ATTORNEYS

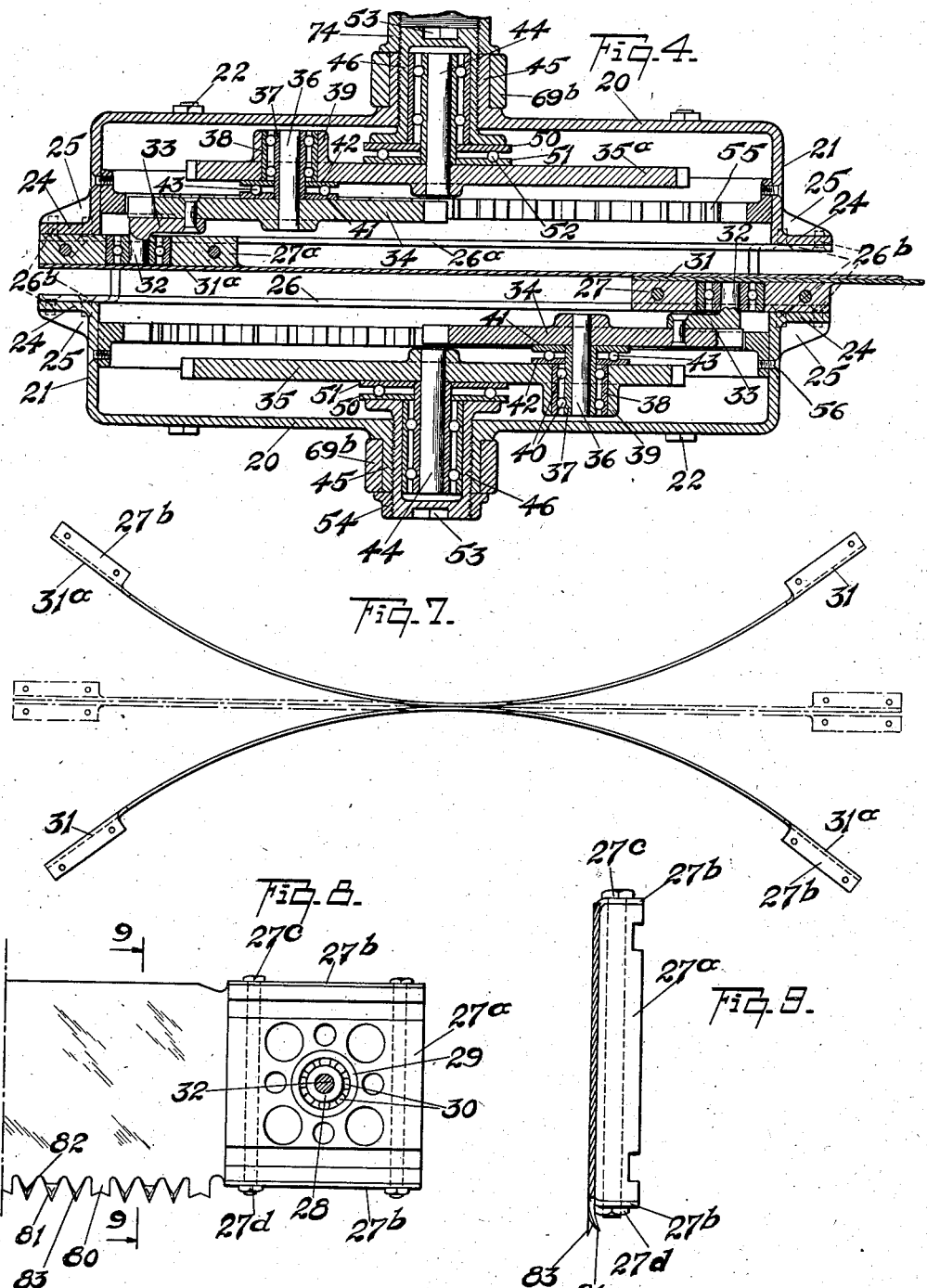

May 26, 1942.   E. DE V. TOMPKINS   2,283,958
PORTABLE SAWING APPARATUS
Filed April 21, 1937   5 Sheets-Sheet 3

INVENTOR.
Edward DeVoe Tompkins
BY
ATTORNEYS.

May 26, 1942. E. DE V. TOMPKINS 2,283,958
PORTABLE SAWING APPARATUS
Filed April 21, 1937 5 Sheets-Sheet 4

INVENTOR.
Edward DeVae Tompkins
BY
ATTORNEYS.

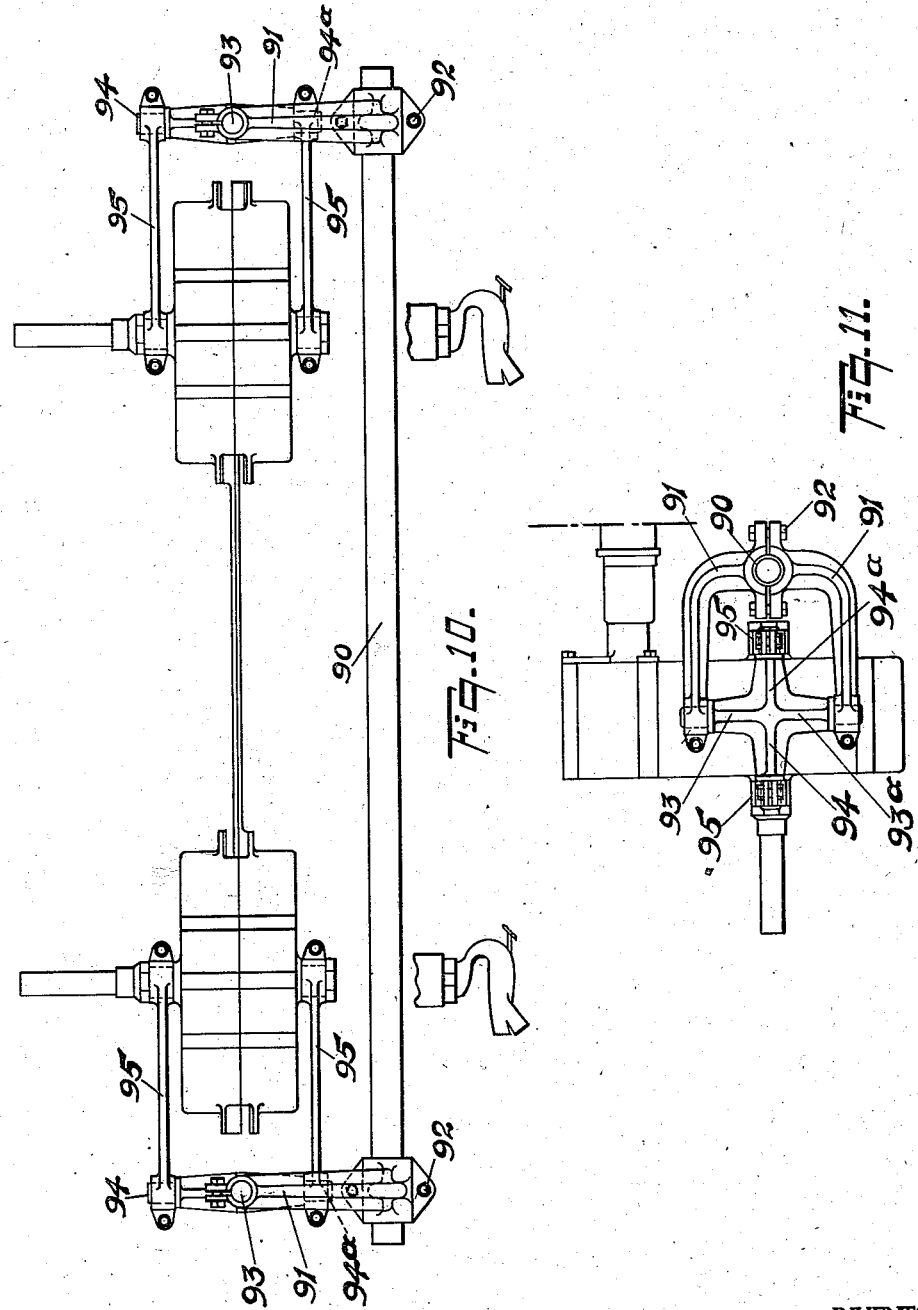

Patented May 26, 1942

2,283,958

UNITED STATES PATENT OFFICE 2,283,958

PORTABLE SAWING APPARATUS

Edward De Voe Tompkins, New York, N. Y.

Application April 21, 1937, Serial No. 138,093

12 Claims. (Cl. 143—68)

This invention relates to power driven portable sawing apparatus and particularly to such an apparatus driven by a rotary motor, which may be an electric motor fed through a flexible cable from a suitable source of electric energy, but, in the best embodiment of the invention, is a compressed air motor supplied with compressed air through a flexible pipe or hose, the exhaust of the motor being utilized for several important purposes, such as cooling the saw-blades and, if desired, the gearing also, as well as blowing away the saw-dust, maintaining a super-pressure in the casings of the gearing to prevent the entrance of dirt or dust to the interior of the casings, and also assisting in the lubrication of the gearings, all as more fully explained hereafter.

The general object of the present invention is to provide a power-driven portable sawing apparatus which may be embodied in an apparatus powerful enough to do the work of sawing relatively large size timbers, while at the same time so light in weight that it can be readily handled by two men, with little more difficulty than would be the ordinary two-man cross-cut saw, and, also, will be much more compact than anything heretofore devised.

A further important object of the present invention is to provide an apparatus such as described which will be very durable under the relatively rough treatment to which such an apparatus is subjected in ordinary use and which will allow the ready removal and replacement of the new blades, as, for example, when they are to be sharpened.

With the above-mentioned general objects in view and some others which will be obvious to those skilled in the art from the description hereinafter, the present invention comprises as its essential feature, a portable sawing apparatus employing two reciprocatory saw-blades, cutting a common saw kerf, each blade being arranged to cut substantially equally in its opposite directions of movement, and to produce at all times substantially the same reaction as its companion saw-blade in both directions of its movement, in combination with positive means mechanically coupled directly to the blades and arranged to reciprocate them in opposite directions simultaneously with equal forces on the two blades at each instant. As a result of the opposite movements simultaneously of the two saw-blades the material being sawed ordinarily need not be fastened, as it is not subjected to any stress tending to cause displacement in the line of the kerf. There is, of course, a slight torque due to the fact that the two blades do not cut in identically the same kerf, but as the lever arm of the torque is only equal to the thickness of a single blade, its effect is negligible, and is overcome by the inertia of the material being sawed and its frictional resistance to sliding angularly on its support.

It is particularly to be noted, however, that in order to accomplish the desired result the blades must at all times make their strokes in union, in opposite directions. Attempts have been made heretofore to provide a sawing apparatus with two blades, but such attempts have not been successful because the driving mechanism was not such as to insure the synchronism of the opposite strokes of the two blades.

Therefore, a further important feature of the present invention is the provision of identical driving means for reciprocating the blades, one driving means for each blade, and the mechanical interconnection of the respective driving means, so that at all times they are compelled to move in unison, and, therefore, to move the blades synchronously.

Furthermore, by locating the driving means for one saw-blade opposite that for the other saw-blade and on opposite sides of the pair of saw-blades, so that the saw-blades at their ends lie between the respective driving means, an important reduction in the length of the apparatus is obtained, as compared with apparatus having the driving means located beyond the end of and in line with the respective saw-blades.

Figure 6:
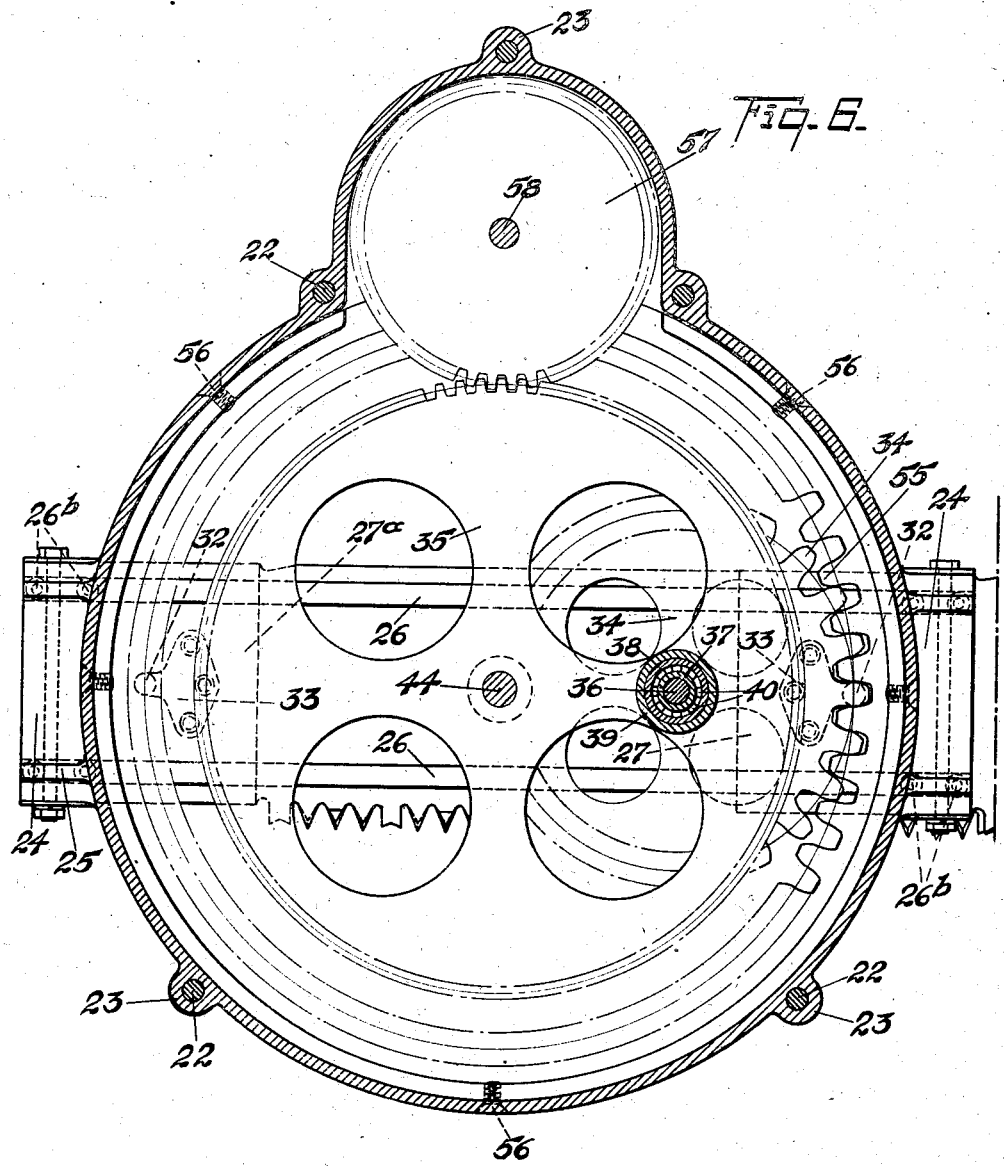

Further important features of the invention will appear in connection with the description of the best embodiment of the invention illustrated in the accompanying drawings, in which Fig. 1 is a side elevation;

Fig. 2 a top plan view;

Fig. 3 an end elevation;

Fig. 4 a horizontal section on the line 4—4, Fig. 1;

Fig. 5 an enlarged vertical section on the line 5—5, Fig. 1;

Fig. 6 a diagrammatic end view of one casing and its enclosed parts, the casing being in section;

Fig. 7 a diagrammatic plan view of a pair of saw-blades;

Fig. 8 is a detail view showing a cross-head and a part of a saw connected to it;

Fig. 9 a section on the line 9—9, Fig. 8, looking in the direction of the arrow;

Fig. 10 a plan view of the sawing apparatus provided with a straining or holding device suitable for ripping or similar work, and Fig. 11 an end view of the said straining or holding device.

The apparatus shown comprises two casings, each containing two sets of epicycloidal gearing for converting rotary motion into reciprocatory motion, and two saw-blades having polished backs in close contact with each other, each end of each blade extending into the respective casing, in which are two cross-heads, one for each blade, and guides for each cross-head. The gearing is specially constructed and arranged, as more fully described hereinafter. Furthermore, each casing contains driving gearing which is common to the two sets of epicycloidal gearing, this driving gearing having a shaft actuated by the particular rotary motor which is employed, there being one motor for each casing, with suitable means convenient to the respective operators for controlling the motor. The motors may be located, each at one side of the respective gear casings.

Each gear casing is of any suitable shape so as to enclose its respective epicycloidal gearing and also the driving gear therefor. In the particular embodiment illustrated, the said casing is shaped to fit the contained parts as closely as possible to save weight. When viewed from one end, the end wall 20 of the casing appears generally circular with a generally semicircular portion at the top, as will be clear from Fig. 1. The side walls 21, conform to the outline of the end walls. Each casing is formed in two parts joined along the middle and held together by suitable fastening means. In the construction illustrated, the fastening means consists of bolts and nuts, indicated at 22, Figs. 1 and 5, extending from one end of the casing to the other end and arranged to draw the two half-casings together, the casing wall being thickened at the points where the bolts are located, these thickened portions projecting on the outside of the casing, as indicated at 23, Fig. 3. The holes for the bolts are formed in the thickened wall portions, in any suitable way, as, for example, by coring them in the walls when casting the casings or by drilling them. Each casing has openings diametrically opposite each other, and is provided with flanges, as indicated at 24, one flange being secured to one casing-half and the other flange to the other casing-half, these flanges 24, in the best embodiment of the invention being strengthened or braced by suitable bracket-fillets as indicated at 25, Fig. 4, the flanges 24 and their bracket-fillets 25 being advantageously cast integral with the respective half casing.

The cross-head guides may be made of flat bars, 26, 26a, of suitable metal, most advantageously of rolled steel, there being four of these bars, each of which is suitably secured to the respective flanges 24, as by machine screws, most advantageously two at each end, as indicated at 26b, Fig. 4.

The cross-head guides in each casing serve as the runways for two cross-heads, which are indicated at 27, 27a, Figs. 4 and 5. Each cross-head has two channels or grooves to receive its respective pair of bars on which it slides, the cross-head 27 being guided by the bars 26, and the companion cross-head 27a being guided by the bars 26a. Each cross-head also has a bearing to receive a driving or wrist pin, more fully described hereinafter. While various forms of bearings may be employed, the best embodiment of the invention comprises a suitable antifriction bearing such as the ball bearing shown in Fig. 8, consisting of an inner bearing ring 28, having an exterior circumferential ball groove or channel, an outer bearing ring 29 having its inner surface provided with a groove or channel for the balls, and a plurality of balls 30 which are placed between the two bearing rings. The outer bearing ring 29 is fitted tightly into an opening formed in the respective cross-head, where it may be secured in any suitable way. It will be noted that the ball-bearing shown and described is of the general type which will resist thrust as well as radial stresses.

As there are two casings, held apart in any way and each casing has two cross-heads, there are four cross-heads to be attached to the two ends of the two saws, one cross-head for each end of each saw. Each end of each saw 31, 31a, is arranged to lie flat against the inner face of its respective cross-head 27, 27a, so that the inner faces of the two saws press against each other and thereby react to hold each cross-head against its respective guide bars. Each end of each saw is secured to its respective cross-head in any suitable manner. One convenient way of accomplishing this result is to provide each end of the saw with two flanges, 27b, Figs. 5 and 8, which engage the top and bottom faces, respectively, of the corresponding cross-head and are held by bolts 27c, extending through the respective cross-head and through both flanges, each bolt having a nut 27d, as shown in Fig. 8. The nuts may be locked by spring lock-washers, one of which is indicated in Fig. 5.

The cross-heads reciprocate in their respective guides across the interior of the respective casing, and in the construction shown, each crosshead, at the limit of its stroke in each direction, appears outside the casing, which has openings in line with the guides, as will be clear from Figs. 4 and 5. This arrangement permits the casing to be made small, thus saving weight, while at the same time allowing the use of a relatively long cross-head.

Each cross-head is engaged by a driving pin, 32, Fig. 4, cylindrical in cross-section and fitting properly into the central opening of the respective inner bearing ring, 28. The driving pin is carried by a gear-wheel, which may be termed a planet-wheel, indicated at 34.

The driving pin, 32, may be mounted on the planet-wheel in any suitable way, but in the best embodiment of the invention it is made with an integral foot, 33, which is riveted to the planet-wheel, 34, as shown in Figs. 4 and 6. The driving pin, 32, is so located that the longitudinal axis will be at right angles to a plane of rotation of the planet-wheel, 34, and will intersect the pitch line of said wheel.

The planet-wheel, 34, is revolubly mounted on and carried around by a gear wheel, 35, which may be designated as the sun-wheel. While the method of mounting the planet-wheel on the sun-wheel may be carried out in various ways, in the best embodiment of the invention the planetwheel, 34, has a stub-shaft, 36, fixed to it, and extending outward, as shown in Fig. 4. This shaft has its longitudinal axis coincident with the central axis of the planet-wheel and enters the inner bearing ring, or sleeve, 37, of an antifriction bearing. Such a bearing is indicated diagrammatically in Fig. 4 and comprises, in addition to the sleeve, 37, an outer bearing sleeve, 38, secured in a hub, 39, carried by the sunwheel, 35. The bearing sleeves, 37 and 38, have raceways for a set of suitable anti-friction devices such as the balls, 40. A suitable thrust bearing may be provided when desired, as, for example, by providing bearing rings, 41 and 42, between the planet-wheel, 34, and the sun-wheel, 35, as shown in Fig. 4. Each of these rings has a ball-channel and in these channels is located a series of balls, 43. The sun-wheel, 35, is revolubly mounted in the casing in any suitable way. In the embodiment illustrated in the drawings, the sunwheel is provided with a stub-shaft, 44, fixed to it and arranged to rotate in an antifriction bearing carried by the casing. The casing has a tubular hub, 45, in which is mounted a bearing-support, 46, adjustable in the hub in the direction of the longitudinal axis of the stub-shaft, 44, for a purpose hereinafter explained. Any suitable form of antifriction bearing may be employed. The one illustrated is similar to that described for the mounting of the planet-wheel, 34. It comprises an inner bearing sleeve, 47, secured to the stub-shaft, 44, an outer bearing sleeve, 48, secured in the bearing-support, 46, and antifriction devices located between the two bearing sleeves, 47 and 48. As shown, the antifriction devices are balls, 49, in two sets, each set running in channels or ball-races formed in the respective bearing sleeves. Also, a thrust bearing may be employed, this, in the present example, comprising two disks, 50 and 51, having ball races in which are located balls, 52.

The bearing-support, 46, may be threaded into the tubular hub, 45, and may have its outer end closed and provided with a polygonal recess as indicated at 53, Fig. 4, to receive the end of a socket wrench, whereby the bearing-support may be rotated to screw it in or out of the hub. A lock-nut, 54, may be provided on the outer end of the bearing-support, 46, for a purpose hereinafter explained.

The planet-wheel, 34, is arranged to mesh with an interiorly toothed circular rack, 55, Fig. 4, which is held in place inside its respective casing-half in any suitable way. As shown, the circular rack, or internal gear ring, 55, is provided with a flange at one side, and machine screws, 56, pass through the casing side-wall into threaded holes in the flange.

The gearing thus far described, comprising the sunwheel, 35, including its mounting or journal, the planet-wheel, 34, including its journal, and the internal gear ring or circular rack, 55, constitutes an epicycloidal gear, and the elements are so dimensioned that the pitch diameter of the planet-wheel, 34, is one-half the pitch diameter of the internal gear ring or circular rack, 55, so that when the sun-wheel, 35, is revolved by the driving gearing, as hereinafter explained, the axis of rotation of the planet-wheel will move orbitally and at the same time the planet-wheel will be revolved about its axis because of its engagement with the fixed circular rack, 55, whereby the driving pin, 32, will be reciprocated along the diameter of the circular rack, 55, in a straight line, thus reciprocating the cross-head, 27, in its guides.

The casing contains two epicycloidal trains of gearing of the kind described, each having its driving pin arranged to drive its corresponding cross-head. The arrangement of the parts is such that when one cross-head is at one end of its stroke, the companion cross-head is at the opposite end of the stroke. This is shown, for example, in Fig. 4, where the cross-head 27 is at the extreme end of its stroke to the right, in Fig. 4, while the cross-head 27a, is at the extreme end of its stroke to the left in said figure. Thus the planet-wheels are at all times on opposite sides of the axial line through the axes of rotation of the respective sun-wheels, and, since the sun-wheels are tied to each other by a common drive, as hereinafter explained, the various stresses brought about by the operation of the duplex gearing are at all times balanced, and, therefore, there is no unbalanced external force to move the casing in any direction.

While any suitable means may be employed for rotating the sun-wheels, the construction illustrated in the drawings, is particularly advantageous, because it permits the two halves of the casing to be separated and replaced with ease and also provides for connection with the rotary motor at either side of the casing. In the embodiment shown, the driving gearing comprises two gear-wheels, 57, 57a, each meshing with its respective sun-wheel, 35, 35a, as shown in Fig. 5.

Each driving gear wheel 57, 57a, is fixed on its respective half of a two-part driving shaft having its two parts, 58, 58a, arranged to be coupled by a suitable coupling device which will permit the ready separation and replacement of the two parts of the driving shaft, when the halves of the casing are taken apart or put together.

One satisfactory form of coupling for the purposes of this invention has the meeting ends of the parts, 58, 58a, of the drive shaft tapered and formed polygonal in cross-section, for example, square, as shown in Fig. 5, and these ends fit snugly into opposite ends of a socket coupling member 60, which may be secured to one shaft part, for example, the part 58, in any suitable way, as by a pin 61, passing transversely through the coupling member and shaft part, the ends of the pin 61, being riveted, if desired.

The driving shaft, formed of the two parts 58, 58a, is suitably journaled in the casing and may be mounted in antifriction bearings. As shown, each bearing has an inner bearing sleeve, 62, an outer bearing sleeve, 63, and suitable antifriction devices such as balls, 64, held in ball-races or grooves formed in the bearing sleeves.

Each end of the drive shaft projects outside the casing and is made polygonal in cross-section, for example, square, as shown in Fig. 5. Any suitable compact rotary motor may be employed to rotate the gearing drive shaft. In the particular embodiment illustrated a rotary motor to be driven by compressed air is illustrated, somewhat diagrammatically, in Fig. 5. This motor, indicated generally at X, has a motor shaft, $x$, driven by a rotor $x^1$, fixed thereon and having vanes indicated at $x^2$ and exhausts through pipe $x^3$, which has an opening to the interior of the casing and a nozzle $x^4$ at the saw blades. The motor shaft is shown as mounted in ball-bearings and is provided with a socket-device $x^5$ arranged to fit on either polygonal end of the gearing drive-shaft, that end which is not engaged by the motor being covered by a readily removable cap, 65, Fig. 5, which may be held to the respective end wall of the casing by machine screws, 66. By removal of the cap, a socket wrench may be applied to the projecting squared end of the drive shaft, in order to turn the gearing by hand when necessary, as, for example, when attaching or detaching a saw-blade to its cross-head, this being possible, because at the two extreme ends of its stroke each cross-head comes outside its casing enough to allow one of its two blade-holding bolts 27c, to be removed, the other bolt of the pair being accessible when the cross-head is moved to the opposite extreme end of its stroke so that it again comes out of the casing on the opposite side.

As hereinbefore described, there are two casings, each with its contained duplex epicycloidal gearing of the type already described. These casings may be held apart in any suitable way, even manually by the two operators, each of whom may grasp the two handles, 74 and 78 of the casing at his end and pull to tension the saw-blades, as for example when felling trees. However, in the complete embodiment of the invention, means are provided for straining or tensioning the blades a predetermined amount. One such means, illustrated in Figs. 1 and 2, comprises two yoke-devices 67, arranged to be secured to the hubs, 45, of the respective casings. As shown, each yoke device is of tubular metal and has one end connected to a split annulus, 68, fitting over the respective hub, 45, of one casing while the other end enters and is clamped in the split eye, 69a, of a connection 69, which has a split annulus, 69b, surrounding the corresponding hub of the other casing.

Suitable means are provided for tightening the split annuli 68 and 69b, such as the bolts and nuts indicated at 70, Fig. 1, and for tightening the split eye, 69a, such as the bolts, 71.

In this embodiment of the invention, the yokes, 67, are connected by a cross-brace, 72, which is put in place after the yokes have been attached to the hubs of the respective casings. This cross-brace consists of two parts, held together by a bolt, 73, provided with a nut, as will be clear from Fig. 3. Each part has a nearly semi-circular jaw at each end and when the nut is tightened on the bolt, 73, the respective pairs of jaws clamp firmly the respective yoke devices.

The lock-nut, 54, not only serves to lock the bearing support, 46, against accidental rotation, but also assists in retaining the split eye of the respective yoke-device against lateral displacement. The lock-nut, 54, is used only on one of the hubs of a casing, the opposite hub having, in place of the lock nut, a tubular handle, 74, which is threaded onto its hub on the side of the casing opposite to the side where the rotary motor is secured.

In one embodiment of the invention, each rotary motor is a one horse power vane type of air motor, normally operating at about 350 revolutions per minute with an air pressure of about 70 pounds per square inch. Motors of this kind have a stalling torque of about 30 foot-pounds. As such motors are known and commercially obtainable, no specific description of the details of construction of such motor is given. However, the casing of such a motor is modified somewhat to provide it with means by which it may be attached in a convenient and readily removable manner to the respective casing of the sawing apparatus. As shown in Fig. 1, the motor casing 75, has a plurality of arms, 76, in this case three, each provided with a hole at its end, so that by removing the nuts from three of the upper bolts, 22, which aid in holding the two halves of the casing together, the arms may be put on said bolts and the nuts replaced and screwed tight, thereby securing the rotary motor firmly to the said casing, in which condition the socket, X5, at the end of the motor shaft, engages the corresponding end of the driving shaft, 58, of the sawing apparatus.

The motor casing is provided with a suitable handle, 78, which is advantageously curved, as shown in Fig. 2, and is intended to be connected to the air-hose leading to a suitable source of compressed air, not shown. In the handle, 78, there is the usual control valve, not shown, which is operated by a lever extending outside the handle, as indicated at 79, convenient to the operator's hand.

In practice, the sawing apparatus requires two operators, one for each end of the apparatus. The motors are connected to the respective casings on opposite sides of the apparatus, so as to have the handle, 78, of each motor in the proper position to be grasped by the right hand of the respective operator, the left hand of the operator grasping the tubular handle 74, which is on the opposite side of the respective casing.

The saw blades employed as elements of the new sawing apparatus are of special construction, in that each is given a predetermined curvature longitudinally, as indicated in Fig. 7, so that when the blades are put in close contact with each other, back to back, as indicated in dotted lines in Fig. 7, and the respective ends of the blades secured to the corresponding cross-heads, there is a sufficiently strong lateral pressure of each blade against the other, whereby they are maintained in close contact with each other in one saw-kerf during the sawing operation, and hence, cannot be spread apart or separated to saw separate kerfs, by any variations in hardness of the timber which is being sawed. The backs of the blades should be well polished.

In an apparatus of the present type, it is advantageous, in order to avoid any tendency of the blades to separate, and, in fact, to increase the tendency to stay in close contact and at the same time to give a rapid cutting action, that the saw-teeth of the blades be shaped in a particular way, as will now be described.

Each blade has a series of groups of teeth, each group comprising two unset cutting teeth, a set cutting tooth and a planer tooth, or clearing tooth. All the unset cutting teeth have their ends or points in a straight line, and all the planer or clearing teeth have their ends in a line, but this line does not register with the line of the unset cutting teeth, because the planer teeth are shorter than the unset cutting teeth. All the set cutting teeth are set in one direction, only, that is, away from the back of the saw-blade. These teeth before setting, were of the same length as the unset cutting teeth, but after setting have their ends in a line which is outward from the vertical plane of the outer face of the unset cutting teeth and slightly above the level of the line of the ends of the latter.

The unset cutting teeth are beveled on the outer faces in both directions so as to provide a sharp cutting edge in each direction of movement of the saw-blades, the bevel serving also as a wedge, so that as the blade is moved longitudinally, the wedge action of the unset cutting teeth of each saw-blade, while it is sawing, will tend to crowd such saw-blade toward its companion saw blade, the wedge action of the unset cutting teeth of one saw-blade acting in opposition to that of the unset cutting teeth of the companion blade. The set cutting teeth are also beveled to provide sharp cutting edges in both directions of movement of the saw-blade, but in this case the bevels are on the inside of the respective set teeth and would tend, by their wedge action, to crowd the saw-blade away from its companion blade. However, this disadvantage is overcome by the wedge action of the greater number of beveled outer faces of the unset teeth.

Figs. 8 and 9 illustrate the construction referred to where each group comprises four teeth, one being the planer tooth, 80, the remaining three teeth being cutting teeth, one of which, 81, is set outward while the cutting teeth at each side of it are unset, that is straight, as indicated at 82 and 83. Each of the teeth 82 and 83 are beveled on the outer face, while the tooth 81, of each group is beveled on the inside face.

The particular embodiment of the invention hereinbefore described is particularly suitable for cutting off piles or sawing heavy timbers, as, for example, in building or repairing docks and piers, though, of course, it finds application in other engineering work where compressed air is generally available for operating riveting, drilling or wood-boring machines such as are commonly known. The new apparatus, constituting the invention, takes advantage of the presence of air-compressing apparatus by providing a compact power-operated sawing apparatus, replacing the usual two-man cross-cut saw and light enough to be handled readily by two men, while, at the same time, giving a rapidity of operation which will materially reduce the labor cost. It may be constructed so as to saw rapidly timbers as large as 20 inches square while, at the same time by the use of modern light and strong metals or alloys, the weight of such apparatus need not exceed 50 pounds, which compares favorably with the weight of other manually handled power-operated tools now in use, for example, wood boring tools operated by compressed air and intended to be handled by one man, such a tool weighing 45 pounds.

It will be observed that with the sawing apparatus of my invention, the only external reaction or stress, not counterbalanced within the apparatus itself, is the lateral stress due to the reaction of the two saws running in opposite directions, which tends to swing the respective casings of the apparatus sidewise first in one direction and then in the other. However, since the two saw blades run in close contact so that their two kerfs merge into one, and since the lever arm of the stress is merely the thickness of the blade, this tendency to cause a lateral swing is readily counterbalanced by a slight resistance on the part of each man who has a relatively long leverage for the resistance to lateral movement because of the widely separated handles, which he grasps.

Thus the lateral stress is of little practical importance and may be disregarded. Aside from this lateral stress there are no external reactions, if the apparatus is accurately built, because there are four identical sets of epicycloidal gearings, two sets of two gearings in each casing, the two in a casing having the planet-wheels set with their respective axes of revolution diametrically opposite each other, as hereinbefore explained.

Furthermore, as there are two saw blades which are reciprocated in opposite directions, there is no tendency of the sawing apparatus to move in the direction of the length of the saws, because the longitudinal reaction of one blade, as it saws a beam, or the like, is always opposite in direction to the reaction of its companion blade. Thus, there is no necessity for clamping the material to be sawed, for any tendency of one blade to move such material is overcome by the tendency of the coacting blade to move the material in the opposite direction, these two reactions of the two blades always being equal and opposite. Of course, it is assumed that each of the two blades cuts in both directions of movement, and that both blades cut equally in each direction. In practice such a result may be attained because the teeth of each blade are arranged to cut in both directions and are identical with those of the companion blade.

By making the teeth of the blades as hereinbefore pointed out, with the points of the cutting teeth extending slightly below the line of the points of the planer or plow teeth, and with the teeth similar in the two blades, the substantially equal but opposite longitudinal reactions of the two blades while sawing, are assured. It will be understood, that the size of the teeth may be as required for the work to be done, or the material to be sawed.

In order to obtain the desired predetermined tension on the blades after they have been connected with their respective cross-heads, the yoke-devices are each subjected to a predetermined compressive stress in the direction of moving the ends of the yoke-device toward each other, the compressive stress being within the elastic limit for the yoke-device. The compressive force may be applied in any suitable way, as by a screw-clamp or even with a so-called Dutch windlass, that is, a double cord or rope twisted by a bar inserted between the strands, or by a turn-buckle draw clamp. While in the compressed condition the ends of the yoke devices are attached and firmly secured to the casings, after which the yoke-devices are freed from the compressive stresses to which they have been subjected, and thereby the reactions of the yoke-devices are thrown upon the casings in the direction of separating them and thus tension the saw-blades to the extent of the force due to the sum of the reactions of the two yoke devices, which, of course, may be predetermined by the amount of compressive stress applied to the yoke-devices before putting them in place. The elastic reactions of the yoke-devices when in place are such as to exert a pull or tension on the saw-blades, that is, within the elastic limits of the blades. The yoke-devices, or other mechanical device, will prevent the casings from being moved toward each other, except to the slight extent due to the elasticity of the yoke devices, or other straining device, and the saw-blades prevent the casings from being moved away from each other. Thus the saw-blades and the straining device coact to maintain the casings at substantially a predetermined distance apart. The connections between the yoke-devices and the hubs of the casings are such as to allow for the slight variations in angle of the ends of the yoke-devices, due to the slight spring of the latter.

The method of removing and replacing saw-blades is as follows:

The tension on the blades is relieved by applying a compressive force to the yoke-devices, in the manner hereinbefore explained. Then the cover cap, 65, at the end of the drive shaft of one casing is removed and a hand crank applied to the squared end of said shaft and actuated to move the cross-heads to the respectively opposite ends of their strokes, thus exposing them enough outside the casings to allow the removal of one bolt for each end of each saw blade. This being done, the hand crank is actuated to bring the cross-heads to the position diametrically opposite that first referred to. This exposes the remaining bolt for each end of each blade, which bolts may then be removed, thereby freeing the blades from their cross-heads, for sharpening and replacement, or to introduce new blades.

The method of replacing the blades is obvious from the above explanation.

It is to be observed that in the apparatus shown in Figs. 1 and 2 there can be no buckling of a blade due to the pushing action of one cross-head, because even if only one motor were operating, such motor when tending to cause a pushing action on one blade, is causing a pull on the other blade, and because of the tension due to the pull on the latter blade, the gearing at the end opposite the working motor is driven in synchronism with the directly driven gearing and thereby develops a pull on the blade which is being pushed by the active motor. Because of this action it is not necessary to provide a very heavy fixed tension on the saw blades by straining them with the yoke device.

It is also to be noted that the two sets of epicycloidal gearing in one casing run in unison with the two sets of identical gearing in the other casing, because the saw-blades form a fixed connection between the four sets of gearing. As each motor drives not only its own two sets of gearing but also the other two sets in the casing opposite, because of the connection through the saw-blades, which may be said to be alternately pulled and pushed by such motor, no difficulty can arise from starting one motor after another, as would naturally occur when one operator opens his motor air valve after the other operator has started his own motor.

In a well constructed apparatus embodying the invention in its best form, there is no vibration other than the trivial tendency to lateral swinging of the casings due to the fact that the two saw-blades do not run exactly in the same path, as has been previously explained. This tendency is easily counteracted without undue effort of the operators in holding their respective pairs of handles.

By the particular combination of elements hereinbefore shown and described, a remarkable compactness is obtained. For example, the apparatus may be designed to cut timber measuring 18 inches along the kerf, and yet be within an out-to-out size of 51 inches, which is much shorter than the present two-man cross-cut hand-saw, used for cutting timber of the size mentioned above.

Although it is not necessary to have the stroke of the blades equal to the maximum size of timber to be sawed, it probably is true that the efficiency is improved if the stroke is increased as the size of timber to be cut is increased. In the apparatus illustrated in the drawings, a timber 18 inches across may be readily cut even though the stroke of the saw blades is only 12 inches.

While, as hereinbefore described, any suitable rotary motor may be employed, there are several important advantages in the use of a compressed air-motor, because its exhaust may be used in part to blow the sawdust from the kerf and by its expansion to cool the blades. Another part may be allowed to enter the casing, thus causing a draft of air outward from the casing, to prevent dust and dirt entering the casing. This air in expanding will have a cooling effect, and serves to assist in distributing lubricant to all parts of the gearing, because oil supplied to the compressed air motor, as is usual in practice, is gradually carried off as a fine mist in the exhaust and that portion which enters the casing condenses inside the same, thus reaching the various parts of the gearing and lubricating it sufficiently.

As hereinbefore described, the bearings for the sun-wheels may be adjusted in or out toward the central plane of the casing, and locked in any adjusted position. Owing to the construction shown, this adjustability of the sun-wheels toward and from each other makes it possible to bring the backs of the saw-blades accurately in the central vertical plane and even to determine the proper degree of pressure between said saw-blades.

By means of the guides for the cross-heads the reaction due to the vertical pressure exerted to feed the saw downward while cutting, is transmitted directly to the casing through the guides, thereby keeping such reactions off the gearings.

It will be noted that the complete apparatus hereinbefore described is particularly intended for use in cross-cutting timber. For some purposes, such, for example, as ripping, or other work where the yoke-devices might interfere, a different form of straining device may be employed. One suitable structure is illustrated in Figs. 10 and 11. This comprises a metallic tubular bar, 90, to which are clamped two end-yokes, 91, having split eye portions, arranged to be squeezed on the bar, 90, by bolts and nuts, indicated at 92. Each end-yoke has its ends provided with bearings to receive the journals of a universal cross having, as usual, four arms 93, 93a, 94, 94a, two, 93, 93a, being mounted in the respective bearings in the end yoke, while the other two arms, 94, 94a, have links, 95, mounted on them, these links engaging the corresponding hubs of the respective casings. The end yokes, 91, and universal crosses, are of such size that the axes of the journals connecting them lie in the plane of the backs of the saw-blades. The pull on the hubs of the respective casings, transmitted by the respective links may be made equal by having the arms, 94, 94a, of equal length. By applying a compressive stress to the two end-yokes, 91, tending to force them toward each other, a suitable lateral stress of the straining bar, 90, may be developed, this being kept within the elastic limit of the bar. Then when the device is connected to the casings, and the compressive force on the two end-yokes removed, the straining bar will react on the casings, tending to separate them and thereby tensioning the saw-blades.

In some classes of work, one casing, with its contained gearing and its motor, may be omitted, in which case the single motor and the single casing with its contained duplex epicycloidal gearing, balanced as hereinbefore described, will be satisfactory, if not too heavy a resistance is encountered by the saws. In this way the weight of the apparatus is materially reduced. Such a light weight apparatus will naturally use shorter saw-blades; will not require the double yoke-device and will not employ the curved blades. It will appear like Fig. 1 with the saw blades cut off just to the left of the nozzle of the motor for the right hand casing and with the double yoke-device and its connectors detached, all the remaining parts being the same as already described.

In this arrangement, however, the motor alternately pushes and pulls each saw-blade and there is no means for maintaining a predetermined tension on the blades, as in the completed embodiment of the invention. However, for lighter classes of work, replacing the ordinary one-man hand-saw, the simpler construction will be found satisfactory, this being due to the balancing of the two epicycloidal gears hereinbefore described.

One important feature of the present invention is the self-alignment of the saws and the casings with their contained mechanisms, due to the fact that the straining mechanism, whether for cross-cutting or for ripping, exerts its reaction uniformly on both hubs of each casing. In putting the yoke-devices of Fig. 1 in place, as hereinbefore described, the split eyes connecting the yoke-devices to the hubs are loose, so that when the pre-tensioning means for the yoke-devices are removed, the reaction of the yoke-devices tends to draw the casings apart and thereby to tension the saw-blades, while the connections of the yoke-devices to the hubs are still loose. Hence, the casings cannot be subjected to any twisting action by the deformation of the yoke-devices but occupy their proper position for proper alignment of the saw-blades and the cross-head guides. Thereupon, upon tightening the split-eyes, the parts of the mechanism are held in their proper position.

The same action takes place when the straining mechanism of Fig. 10 is employed. It will be noted that the links are connected to the hubs of the casing by split eyes. By having these loose while assembling the straining mechanism, and until after the pre-tensioning devices are removed, the reaction of the straining mechanism pulls all parts into proper alignment, whereupon the various split eyes of the mechanism may be tightened to hold all parts rigidly.

The construction of the yoke-device of Fig. 1 is such that each yoke may be swung down from its vertical position to a position where both yokes are in a horizontal plane, this being possible because of the screw-thread connection shown at 77. In doing this the bolts 70 and 71 are loosened, which insures the proper alignment of the casings and blades by the tension of the latter. Then the split eyes and connectors may be screwed up to hold the parts rigidly.

What is claimed is:

1. In a portable sawing apparatus, the combination, with two saw-blades arranged to reciprocate longitudinally with their backs in contact with each other, and to cut equally in each direction, of four sets of identical epicycloidal gearings, each arranged to convert rotary motion into reciprocating motion, each being connected to the respective end of its respective saw-blade, two sets of said gearings being arranged near one end of the sawing apparatus opposite each other with the saw blades between them and the other two sets near the other end of the sawing apparatus opposite each other with the saw-blades between them, and a common drive mechanism for each two sets of gearings.

2. In a portable sawing apparatus, the combination, with four sets of identical epicycloidal gearings each arranged to convert rotary motion into reciprocatory motion, and two saw-blades arranged with their backs in contact, each having its two ends connected to two sets of said gearing for longitudinal reciprocation, one set of gearing at each end, the four sets of gearing being symmetrically arranged with respect to the plane through the backs of said saw-blades, gearing common to each two sets of gearing at each end of the blades for maintaining all the gears in unison, and power means for driving at least one of said common gearings.

3. In a portable sawing apparatus, the combination, with two saw-blades, each having a preformed curve longitudinally, convex on the back of the blade, said blades being arranged to reciprocate longitudinally with their backs in contact with each other, and to cut equally in each direction, of four sets of identical epicycloidal gearings, each arranged to convert rotary motion into reciprocating motion, each being connected to the respective end of its respective saw-blade, two sets of said gearings being arranged near one end of the sawing apparatus opposite each other with the saw-blades between them and the other two sets near the other end of the sawing apparatus opposite each other, with the saw-blades between them, a common drive mechanism for each two sets of gearings, and resilient means having a predetermined compression for holding the two sets of gearings at one end of the apparatus in spaced relation to the two sets of gearing at the other end of the apparatus to tension the blades longitudinally.

4. In a portable sawing apparatus, the combination, with two saw-blades, each having a preformed curve longitudinally, convex on the back of the blade, said blades being arranged to reciprocate longitudinally with their backs in contact with each other, and to cut equally in each direction, of four sets of identical epicycloidal gearings, each arranged to convert rotary motion into reciprocating motion, each being connected to the respective end of its respective saw-blade, two sets of said gearings being arranged near one end of the sawing apparatus opposite each other with the saw-blades between them and the other two sets near the other end of the sawing apparatus opposite each other, with the saw-blades between them, a common gearing for each two sets of gearings whereby they are compelled to rotate in unison, means for driving at least one of said common gearings, a resilient yoke-device having a predetermined compression arranged to act in cooperation with the saw-blades to hold the two sets of gearing at one end of the apparatus in spaced relation to the two sets of gearing at the other end of the apparatus, and means for adjusting said yoke-device.

5. In a portable sawing apparatus, the combination, with two saw-blades, each having a preformed curve longitudinally, convex on the back of the blade, said blades being arranged to reciprocate longitudinally with their backs in contact with each other, and to cut equally in each direction, of four sets of identical epicycloidal gearings, each arranged to convert rotary motion into reciprocating motion, each being connected to the respective end of its respective saw-blade, two sets of said gearings being arranged near one end of the sawing apparatus opposite each other with the saw-blades between them and the other two sets near the other end of the sawing apparatus opposite each other, with the saw-blades between them, a common drive mechanism for each two sets of gearings, and a pair of yoke devices coacting to hold the two sets of gearing at one end of the apparatus in spaced relation to the two sets of gearing at the other end of the apparatus, said yoke devices being adjustable into erect planes and also into planes at an angle to the erect planes.

6. In a portable sawing apparatus, the combination, with two saw-blades arranged to reciprocate longitudinally with their backs in contact with each other, and to cut equally in each direction, of two sets of identical epicycloidal gearings, each arranged to reciprocate its respective saw, said sets being arranged opposite each other on opposite sides of the ends of the two saws, and a rotary compressed air motor arranged to drive both sets of gearings and to discharge its exhaust into contact with the gearings and saw-blades.

7. In a portable sawing apparatus, the combination, with a pair of sets of identical epicycloidal gearings, each set comprising a sun-wheel, a planet-wheel revolubly mounted on said sun-wheel, and a fixed internal circular rack meshing with the planet-wheel, the pitch diameter of the planet-wheel being one-half that of said circular rack, the axis of rotation of one planet-wheel of one set of epicycloidal gearing being positioned on its sun-wheel at all times in diametrically opposite relation to that of the planet-wheel of the other set, of means for driving the two sun-wheels in unison, a pair of cross-heads, a pair of driving pins, each of which is mounted on its respective planet-wheel with its axis normal to the plane of rotation of its planet-wheel and intersecting the pitch-line of the latter, said driving pins being journaled in the respective cross-heads and arranged to bring simultaneously the respective cross-heads to the relatively opposite extreme ends of their respective strokes, guides located between the two sets of epicycloidal gearings and arranged to guide the respective cross-heads rectilinearly, and a pair of saw-blades, each connected to its respective cross-head, each blade being provided with teeth for cutting equally in each direction of movement of the blade and arranged to produce at all times substantially the same amount of longitudinal reaction as that of its companion blade.

8. In a portable sawing apparatus, the combination, with a pair of sets of identical epicycloidal gearings, each set comprising a sun-wheel, a planet-wheel revolubly mounted on said sun-wheel, and a fixed internal circular rack meshing with the planet-wheel, the pitch diameter of the planet-wheel being one-half that of said circular rack, the axis of rotation of one planet-wheel of one set of epicycloidal gearing being positioned on its sun-wheel at all times in diametrically opposite relation to that of the planet-wheel of the other set, of means for driving the two sun-wheels in unison, means for adjusting the sun-wheels toward and from each other, a pair of cross-heads, a pair of driving pins, each of which is mounted on its respective planet-wheel with its axis normal to the plane of rotation of its planet-wheel and intersecting the pitch-line of the latter, said driving pins being journaled in the respective cross-heads and arranged to bring simultaneously the respective cross-heads to the relatively opposite extreme ends of their respective strokes, guides located between the two sets of epicycloidal gearings and arranged to guide the respective cross-heads rectilinearly, and a pair of saw-blades, each connected to its respective cross-head, each blade being provided with teeth for cutting equally in each direction of movement of the blade and arranged to produce at all times substantially the same amount of longitudinal reaction as that of its companion blade.

9. In a portable sawing apparatus the combination, with two identical saw-blades arranged to reciprocate longitudinally with their backs in contact with each other and to cut equally in each direction of movement, of two identical sets of gearings, one for each blade, each set being arranged to reciprocate its respective saw-blade in a direction of movement at all times opposite to that of its companion blade and always, at each instant, with a rate of movement equal to that of its companion blade, said sets of gearing being arranged opposite each other with an intervening space between them to receive the corresponding ends and cutting portions of said saw-blades, whereby the total length of the apparatus is reduced, while allowing a full stroke for the blades, and means for driving both sets of gearing in unison.

10. In a portable sawing apparatus, the combination, with a pair of sets of identical epicycloidal gearing, each set comprising a sun-wheel, a planet-wheel revoluble about an axis carried around by the sun-wheel, and means for rotating the planet-wheel about its said axis at twice the rate of rotation of the sun-wheel, said sets of gearing being arranged directly opposite each other, with the central axes of their sun-wheels in alignment, and with the axes of the planet-wheels diametrically opposite each other, said sets being spaced apart to provide a runway for saw-blades, stationary guideways located in said runway-space between the gearings parallel to the diameters of the sun-wheels, and a pair of cross-heads movable in said guides and arranged to travel across the common axial line of the sun-wheel centers from one side to the other side of it, of a common drive for rotating the sun-wheels in unison, means carried by each planet-wheel and pivotally connected to its respective cross-head for reciprocating the cross-head in its respective guideway, and a pair of identical saw-blades, each connected to its respective cross-head with the backs of the blades in contact, each blade being provided with teeth for cutting equally in each direction of movement of the blade and arranged to produce at all times substantially the same amount of longitudinal reaction as that of its companion blade.

11. In a portable sawing apparatus, the combination, with four sets of identical epicycloidal gearing, each set comprising a sun-wheel, a planet-wheel revoluble about an axis carried around by the sun-wheel, and means for rotating the planet-wheel about its said axis at twice the rate of rotation of the sun-wheel, said sets of gearing being arranged in pairs at opposite ends of the apparatus, the sets of gearing of each pair being arranged directly opposite each other, with the central axes of their sun-wheels in alignment, and the axes of their planet-wheel diametrically opposite each other, said sets of gearing of each pair being spaced apart to provide a runway for saw-blades, stationary guideways located in each of said runway-spaces between the respective pairs of gearings parallel to the diameters of the corresponding sun-wheels, and a pair of cross-heads for each pair of sets of gearing movable in the respective guides and arranged to travel across the common axial line of the respective sun-wheel centers from one side to the other side of it, of a common drive for rotating each pair of sun-wheels in unison, means carried by each planet-wheel and pivotally connected to its respective cross-head for reciprocating the cross-head in its respective guideway, and a pair of identical saw-blades, each connected at each end of its respective cross-head with the backs of the blades in contact, each blade being provided with teeth for cutting equally in each direction of movement of the blade and arranged to produce at all times substantially the same amount of longitudinal reaction as that of its companion blade.

12. In a portable sawing apparatus, the combination, with four sets of identical epicycloidal gearing, each set comprising a sun-wheel, a planet-wheel revoluble about an axis carried around by the sun-wheel, and means for rotating the planet-wheel about its said axis at twice the rate of rotation of the sun-wheel, said sets of gearing being arranged in pairs at opposite ends of the apparatus, the sets of gearing of each pair being arranged directly opposite each other, with the central axes of their sun-wheels in alignment, and with the axes of their planet-wheel diametrically opposite each other, said sets of gearing of each pair being spaced apart to provide a runway for saw-blades, stationary guideways located in each of said runway-spaces between the respective pairs of gearings parallel to the diameters of the corresponding sun-wheels, and a pair of cross-heads for each pair of sets of gearing movable in the respective guides and arranged to travel across the common axial line of the respective sun-wheel centers from one side to the other side of it, of a common drive for rotating each pair of sun-wheels in unison, means carried by each planet-wheel and pivotally connected to its respective cross-head for reciprocating the cross-head in its respective guideway, a pair of identical saw-blades, each connected at each end to its respective cross-head with the backs of the blades in contact, each blade being provided with teeth for cutting equally in each direction of movement of the blade and arranged to produce at all times substantially the same amount of longitudinal reaction as that of its companion blade, and resilient means for holding the respective pairs of gearings apart to tension the blades.

EDWARD DE VOE TOMPKINS.